United States Patent [19]

Zakharov

[11] 3,999,332
[45] Dec. 28, 1976

[54] MECHANISM FOR TRUING DISK-LIKE ABRASIVE TOOLS

[76] Inventor: Ivan Dmitrievich Zakharov, Karkazsky bulvar, 41, korpus 1, kv. 5, Moscow, U.S.S.R.

[22] Filed: Dec. 20, 1974

[21] Appl. No.: 534,751

[52] U.S. Cl. .......................... 51/165.87; 125/11 B; 125/11 GA
[51] Int. Cl.² ...................................... B24B 53/00
[58] Field of Search .......... 125/11 R, 11 B, 11 GA; 51/165.87, 165.88, 5 D

[56] References Cited
UNITED STATES PATENTS

| | | | |
|---|---|---|---|
| 1,463,033 | 7/1923 | Beckett | 125/11 B |
| 1,527,295 | 2/1925 | Cumner | 125/11 B |
| 1,892,388 | 12/1932 | Edgar | 125/11 B |
| 1,935,328 | 11/1933 | Munn | 125/11 B |
| 2,392,332 | 1/1946 | Mahlmeister | 125/11 B |
| 2,396,891 | 3/1946 | Seyferth | 125/11 B |
| 3,110,132 | 11/1963 | Bassoff | 51/165.87 X |

*Primary Examiner*—Harold D. Whitehead
*Attorney, Agent, or Firm*—Lackenbach, Lilling & Siegel

[57] ABSTRACT

A truing mechanism for use in a straight bevel gear cutting machine tool operating on a profile generating principle with the use of a single disk-like abrasive tool, said mechanism being mounted on a carriage with said abrasive tool and provided with truing elements driven from a self-contained driving means along paths corresponding to cutting profiles of the tool, said truing elements, according to the invention, being capable of moving, simultaneously with the abrasive tool, in directions parallel to the rotational axis of the disk-like abrasive tool and normal to the axis thereby ensuring that truing operation takes place beyond the zone of contact between said tool and the gear being worked.

9 Claims, 10 Drawing Figures

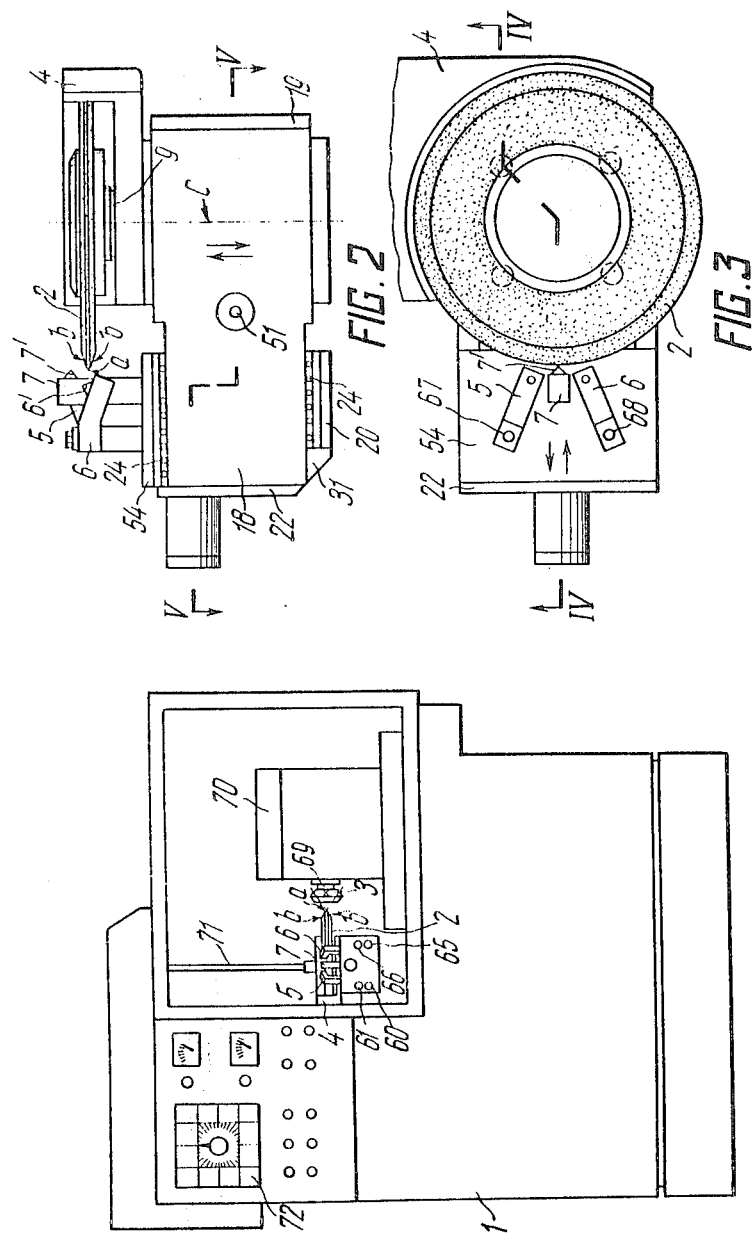

MECHANISM FOR TRUING DISK-LIKE ABRASIVE TOOLS

BACKGROUND OF THE INVENTION

This invention relates to gear cutting machines and more particularly to mechanisms for truing disk-like abrasive tools used in a gear grinding machine tools for cutting straight bevel gears.

The invention may be advantageously used for truing abrasive tools in process of cutting fine-pitch straight bevel gears directly from heat-treated blanks hardened to a high degree of hardness (HRC 60–64) and without preliminary forming tooth spaces, as well as from blanks of steels not amenable to gear shaping or hobbing.

Known in the art are mechanisms for truing disk-like abrasive tools used in machine tools for cutting straight bevel gears with a single tool operating on a profile generating principle.

The conventional mechanism is mounted on a machine tool carriage mounting an abrasive tool and provided with truing elements driven from a self-contained drive means along paths corresponding to cutting profiles of the tool.

The truing elements comprise two levers each provided with a diamond truing tool. One of said diamond tools is used for truing taper and cylindrical active surfaces of the abrasive tool (active surfaces of the tool are those contacting surfaces being worked), while the other of said diamond tools is adapted for truing the face (or inactive) surface of the abrasive tool in case of changing the tooth module.

A mechanism for driving the lever with the diamond tool used for truing taper and cylindrical surfaces of the abrasive tool in enclosed into a separate housing which is stationary with respect to the carriage, said driving mechanism comprising a set of cams and templets having complex-shaped straightline, curvilinear and cylindrical surfaces. Said lever is arranged so that the diamond truing tool thereof is located in the region of contact between the abrasive tool and the tooth gear being machined, that is, in the working zone, while the feeding of said lever along with the diamond tool to compensate for the abrasive tool wear is carried out from the abrasive tool per se, the abrasive tool being mounted on a slide of the carriage.

The arrangement of the lever with the diamond tool in the working zone makes it impossible to perform truing of the abrasive tool without withdrawing the abrasive tool from the gear being machined.

It is necessary to stop the machine tool during its idle running, to shift the article being treated from the abrasive tool, to perform truing of the latter, to return the article into the initial position and only then to continue the operation.

All this reduces the efficiency of the machine tool, while periodic withdrawal of the article from the working zone impairs the accuracy of the straight bevel gears being manufactured due to possible displacement of the gear being machined with respect to the abrasive tool.

The other lever with the diamond tool for truing a face surface of the abrasive tool is also provided with a separate drive means in the form of a screw pair. This lever is mounted on an abrasive tool safety guard and set into motion by hand. This fact both is very dangerous to an operator and leads to a considerable loss of time resulted in a low machine tool efficiency.

Furthermore, the use of the conventional truing mechanism is limited since it is not suitable for truing abrasive tools having the periphery defined by three types of active surfaces, such as two taper surfaces and one cylindrical surface, the latter being confined between the former ones, the abrasive tool of the kind referred to being used for cutting fine pitch bevel gears without preliminary forming tooth spaces from blanks heat-treated to a high degree of hardness.

SUMMARY OF THE INVENTION

It is an object of the invention to provide a mechanism for truing a disk-like abrasive tool in a straight bevel gear cutting machine tool operating on a profile generating principle with the use of said abrasive tool, said mechanism ensuring truing of abrasive tools having three active surfaces with two of said surfaces being taper and one cylindrical, the abrasive tool being used for direct cutting of fine-pitch bevel gears (with modules less than 1.5 mm) and secondary cutting of gears (with modules more than 1.5 mm) from blanks with previously formed tooth spaces.

These and other objects are achieved in a mechanism for truing disk-like abrasive tools for use in a straight bevel gear cutting machine tools operating on a profile generating principle with the use of a single said abrasive tool, the mechanism being mounted on a carriage carrying said abrasive tool and provided with truing elements driven from a self-contained driving means along paths corresponding to cutting profiles of the tool, wherein, according to the invention, the truing elements are capable of moving in directions parallel and normal with respect to the axis of rotation of the disk-like abrasive tool thereby ensuring that truing operation takes place beyond the limits of the contact zone between the abrasive tool and the gear being worked.

The above feature makes it possible to perform truing of the abrasive tool both during the idle running or the working cycle.

Thus, it is possible to restore cutting ability of the abrasive tool with its position above the cradle of the machine tool, when one side of a tooth space is worked or with the position of the tool below the cradle when other side of the tooth space is worked.

All the above mentioned features promote an increased efficiency of the gear cutting operation and ensure an identical shape for active surfaces of the abrasive tool thereby improving the accuracy of the finished article.

Another feature of the invention resides in the fact that each truing element comprises a lever carrying a diamond tool and is capable to execute reciprocating motion, an intermediate lever being moved in a plane parallel to the generatrix of the cylindrical surface of the disk-like abrasive tool while two extreme levers being moved in planes parallel to generatrices of taper surfaces confining said cylindrical surface.

This feature makes it possible to preset for each truing element a simple path of its movement and, therefore, to use guides, levers and their associated drives simple in structure and in manufacture, as well as to provide an easy setting procedure for each of the truing elements irrespective of the others.

It is expedient, when moving the truing members in the direction parallel to the rotational axis of the abrasive tool, to operatively connect said truing mechanism to the abrasive tool.

Due to such positive interconnection, the truing elements change their coordinates just in the moments when the abrasive tool coordinates are changed with respect to the cradle axis, the amount of both said changes being strictly equal. This increases the accuracy and reliability of the truing operation and simplifies the structure of the mechanism.

It is advantageous to perform the positive interconnection between the truing mechanism and the abrasive tool by means of a sleeve accommodating a tool spindle rotatable with respect thereto, said sleeve being provided with drive means the perform setting movements along with the spindle in directions parallel to the axis of rotation of the abrasive tool. A slot is made in the sleeve, said slot having surfaces normal to the longitudinal axis of the sleeve and being in tight engagement with a key inserted into said slot and rigidly fixed to the housing of the mechanism for the sake of setting movements in the direction parallel to the axis of rotation of the abrasive tool, said movements being necessary to ensure correct mutual positioning of the truing elements and cutting surfaces of the abrasive tool during the truing operation.

The positive interconnection between the mechanism and the tool made according to the invention obviates the necessity to use an additional drive means for the truing elements, said additional drive means being generally used for performing setting movements of the truing elements in the directions parallel to the axis of rotation of abrasive tool. Besides, this interconnection ensures accurate displacements, a structural rigidity for the truing mechanism, as well as the reliable operation and easy adjustments.

To provide movements of the truing elements in the direction normal to the axis of rotation of the abrasive tool, it is advantageous to arrange said elements on a slide to ensure their movement together with the slide, the latter, in turn, being mounted in a housing, and to provide them with an individual drive means to perform said movements.

Such an arrangement of the truing elements makes it possible to perform their reciprocating movements along paths defined by active cutting surfaces of the disk-like abrasive tool, to feed the tool for an amount of its worn layer and to control the rate of wear.

It is further expedient to make the slide drive means in the form of a screw pair with the nut of said pair accommodated in a key and a ratchet wheel to be mounted on the vacant end of the screw, said wheel being fastened to the slide rotationally about the screw axis thereby ensuring movements of the slide in the direction normal to the rotational axis of the abrasive tool by means of a pawl mounted on the intermediate lever set into reciprocation from a rack formed on the side surface of the slide and engaged with a central tooth gear mounted on a common shaft with another two gears rigidly fixed to said shaft and engaging the extreme levers to impart reciprocating movements thereto.

This makes it possible to obviate the necessity to use a specially designed drive means to perform the movements of the truing elements along the predetermined paths, and ensures an accurate and reliable feed of the truing elements for the amount of wear of the disk-like abrasive tool just in that period of the movement of the truing elements when the diamond tool is located beyond the zone of its contact with the abrasive tool. Besides, this provides a simple, compact and lightweight truing mechanism.

It is advantageous, in accordance with the latter embodiment of the invention, to provide teeth on the outer surface of the nut accommodated in the key, said teeth being engaged with a worm having a shaft extending outside the housing of the mechanism in order to make it accessible for setting movements of the truing elements in the direction of the axis of rotation of the abrasive tool.

Thus, the slide drive means apart from its main function is used also for adjustment movements of the truing elements in the direction normal to the axis of rotation of the abrasive tool.

Furthermore, the invention is characterized in that the slide is provided with slots adapted to accommodate guides along which levers are moved, the guides corresponding to the extreme levers being capable of being rotatably adjusted about the axes of sleeves fixed to the slide, said rotation being necessary to change a truing angle of taper surfaces of the abrasive tool, said sleeve axes coinciding with the geometrical axis of the tooth gear shaft. This rotation is carried out by means of screws mounted on the slide and rotating in opposite directions.

Such an arrangement of the slide makes it possible to widen the technical capabilities of the truing mechanism and the machine tool as a whole and ensures truing of the abrasive tool along two taper surfaces at different angles corresponding to a profile angle of the generating gear used for a pair of gears being manufactured.

BRIEF DESCRIPTION OF THE DRAWINGS

The invention will now be described with respect to a preferred embodiment thereof and with reference to accompanying drawings, wherein:

FIG. 1 is a schematic general view, in front elevation of a straight bevel gear cutting machine tool operating on a profile generating principle and provided with a mechanism for truing a disk-like abrasive tool made in accordance with the present invention;

FIG. 2 is a general front view, in side elevation, of a truing mechanism made in accordance with the present invention;

FIG. 3 is a general top plan view of a truing mechanism made in accordance with the present invention;

DESCRIPTION OF THE PREFERRED EMBODIMENT

Figure 4:
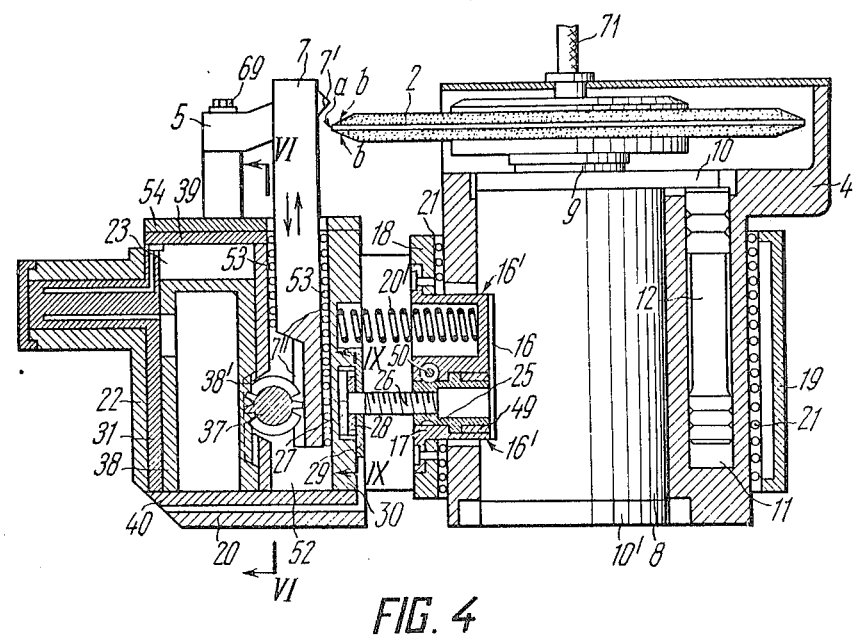
FIG. 4 is a sectional view along lines IV—IV of FIG. 3, showing the arrangement of the abrasive tool accommodated in the sleeve with respect to the housing and its associated truing elements.

The invention provides a mechanism for truing disk-like abrasive tools for a machine tool (FIG. 1) intended to cut a straight bevel gear 3 with the use of a single abrasive tool 2, said machine tool operating on a profile generating principle.

The truing mechanism is mounted on a carriage 4 of the machine tool 1 carrying the disk-like abrasive tool 2. The mechanism is provided with truing elements driven from a self-contained driving means along paths corresponding to the planes of the the surfaces defining the shape of the abrasive tool 2, including a single cylindrical cutting surface a (FIG. 3) confined by two taper surfaces b of the disk-like abrasive tool 2.

The truing mechanism comprises levers 5, 6, 7.

According to the invention, provision is made for the truing elements of the mechanism to be moved in the directions parallel (arrows in FIG. 2) and normal (arrows in FIG. 3) to the axis c of rotation of the disk-like abrasive tool 2, thereby making it possible for the truing operation to be performed beyond the zone of contact between the abrasive tool 2 and the tooth gear 3 being worked. More specifically, the truing elements are mounted to be simultaneously displaced with displacements of the abrasive tool in directions parallel to the axis c. In this manner, the truing elements are always available to shape the abrasive tool in all axial positions of the same without the necessity of critical adjustments to bring the truing elements into alignment with the abrasive tool with each axial displacement of the tool. Additionally, the truing elements are mounted to gradually advance in a direction normal to the axis c towards the abrasive tool to compensate for wear. While the abrasive tool and the truing elements move simultaneously in directions parallel to the axis c, the truing elements move relative to the abrasive tool in the direction normal to the axis c to bring the truing elements progressively closer to the axis c.

According to the invention, in order to impart the axial movements of the abrasive tool 2 to the truing elements in the direction parallel to the rotational axis c of the abrasive tool 2, the mechanism is operatively connected to said tool 2.

This operational interconnection between the tool 2 and the truing mechanism is carried out through a sleeve 8 (FIG. 4) accommodating rotatably with respect thereto a spindle 9 of the abrasive tool 2. The sleeve 8 is connected by means of flanges 10 and 10' to movable members of the power cylinders 11, said connection being required to perform combined movements of the sleeve along with the adjusting movements of the spindle in either direction parallel to the rotational axis of the tool 2.

Figure 5:
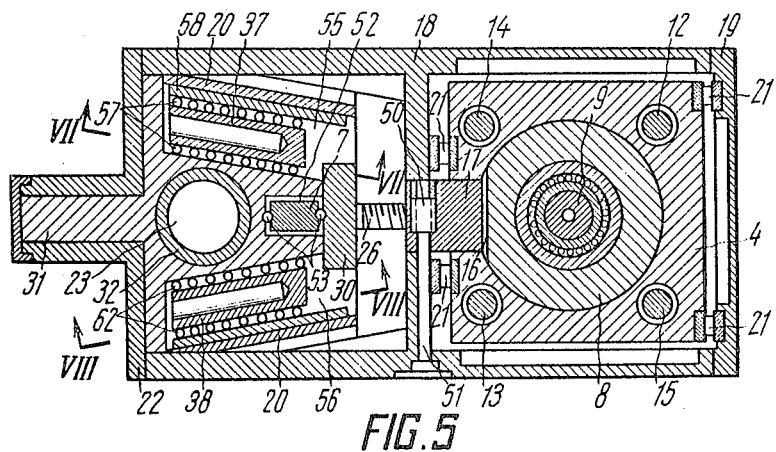
FIg. 5 is a sectional view along lines V—V of FIG. 2.

In the particular embodiment shown, the power cylinders 11 are defined as bores made in the body of the carriage 4, said bores accommodating movable elements such as plungers 12, 13 and 14, 15 shown in FIG. 5.

The plungers 12 and 13 serve to shift the sleeve 8 with the spindle 9 in one direction while the plungers 14 and 15 move them in the opposite direction. The plungers 12–15 are arranged to move in directions parallel to the axis c and, by means of flanges 10 and 10', to axially displace the sleeve 8, and, therefore, also the spindle 9 and the abrasive tool 2. Such axial displacements take place place relative to the carriage 4 and are sometimes required in the cutting of bevel gears.

The sleeve 8 (FIG. 4) is made with a slot 16 having surfaces 16' perpendicular to the longitudinal axis of the sleeve 8, said surfaces embrace tightly a key 17 accommodated in the slot 16 and rigidly fixed to the housing 18 of the truing mechanism. Accordingly, the housing 18 follows the axial displacements of the sleeve 8 and the abrasive tool 2 in directions parallel to the axis c upon the actuation of the respective plungers 12–15. When the housing 18 moves parallel to the axis c, it moves simultaneously with the abrasive tool 2 relative to the carriage 4.

The housing 18 (FIGS. 4, 5) of the mechanism comprises H-shaped frame with two compartments.

A carriage 4 with a cover 19 is accommodated in one of the compartments of the housing 18.

A slide 20 is mounted in the second compartment. The slide 20, being mounted in the housing 18, shares the axial displacements of the housing 18 in directions parallel to the axis c when the respective plungers 12—15 are actuated.

Guides 21 are provided, as best shown in FIGS. 4 and 5, between the carriage 4 and the housing 18 for combined adjusting movements therewith in either direction parallel to the axis "C" of rotation of the abrasive tool 2, said movement ensuring required positions of the levers 5, 6, 7 with respect to cutting surfaces "a" and "b" of the abrasive tool 2 during the truing operation. Accordingly, the guides 21 facilitate relative axial movements between the carriage 4 and the slide 20 supporting housing 18 which permits the truing elements to follow the axial displacements of the abrasive tool 2 parallel to the axis c.

According to the invention, in order to provide movement of the truing elements in the direction normal to the axis "C" of rotation of the abrasive tool 2 to compensate for wear of the abrasive tool, they are mounted on the slide 20 accommodated in the second compartment of the housing 18 and are provided with a self-contained drive means to perform movements of the slide 20, and the truing elements mounted thereon, towards the axis c. Such movements normal to the axis c progressively decrease the distance between the slide 20 and the axis c of the abrasive tool 2 to compensate for wear of the tool. By being remote from the working zone, truing of the abrasive tool can take place during or between gear cutting operations without disrupting the operation of the machine 1 and without impairing the efficiency thereof.

Figure 6:
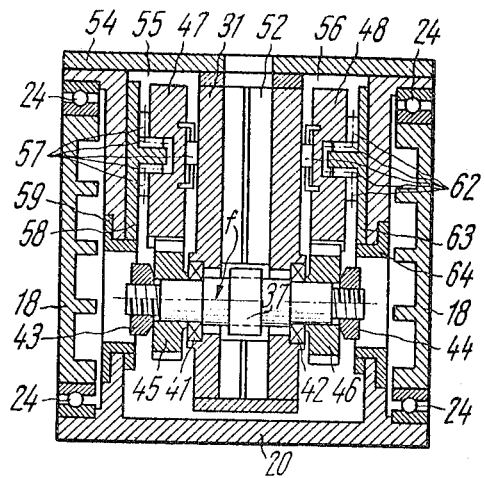
FIG. 6 is a sectional view along lines VI—VI of FIG. 4.

There is a cover 22 for the second compartment of the housing 18, said cover having openings for feeding oil to a hydraulic cylinder 23 of the drive means for the slide 20. The second purpose of the cover is to be a support for a measuring instrument checking the displacement of the slide 20. Guides 24 (FIG. 6) are disposed between side walls of the compartment of the housing 18 and wings of the slide 20 to provide movement of the latter together with the truing elements mounted thereon in the direction normal to the axis "C" of rotation of the abrasive tool 2.

Figure 7:
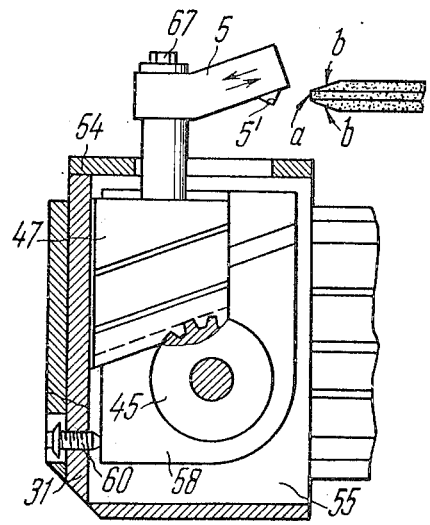
FIG. 7 is a sectional view along lines VII—VII of FIG. 5.
Figure 8:
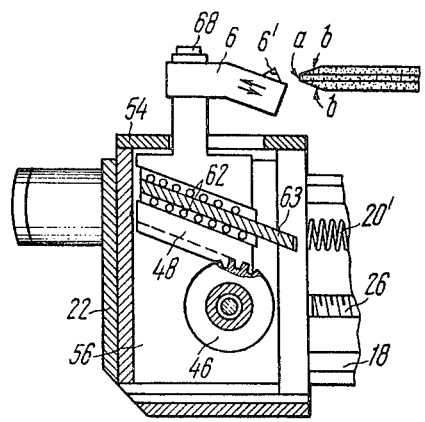
FIG. 8 is a sectional view along lines VIII—VIII of FIG. 5 illustrating relationship between levers carrying tools for truing taper surface of the disk-like abrasive tool in accordance with the invention.

According to the invention, each of the levers 5, 6, 7 (FIGS. 4, 7, 8) carries a diamond tool 5', 6', 7' respectively. Said levers are capable to perform reciprocating and rectilinear movements relative to the slide 20 from the drive means thereof so that the intermediate lever 7 may be moved (in the direction of arrow of FIG. 4) in a plane parallel to a generatrix of a cylinder surface a of the disk-like abrasive tool 2, while two extreme levers 5 and 6 may be moved in planes parallel to generatrices of taper surfaces *b* confining the cylindrical surface *a*.

According to the invention, the drive means for a slide 20 comprises a screw pair with a nut 25 (FIG. 4) of this pair accommodated in a key 17 and with a screw 26 carrying at the free end thereof a ratchet wheel 27 and stopping gear wheel 28. These ratchet wheel and stopping wheel 27 and 28 respectively are mounted in the slide 20 rotatably about the axis of the screw 26 due to the provision of a holding cap 29, guiding bar 30 and T-shaped housing 31.

To adjust a backlash in the screw pair a spring 20' is placed between the housing 18 and the slide 20.

Figure 9:
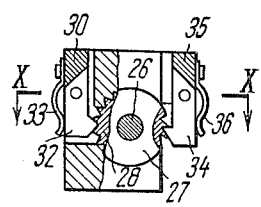
FIG. 9 is a partial sectional view along lines IX—IX of FIG. 4 illustrating the structure of a slide feeding mechanism.
Figure 10:
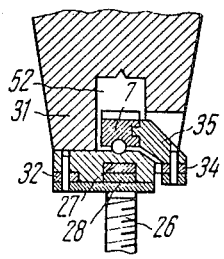
FIG. 10 is a sectional view along lines X—X in FIG. 9.

A locking member 32 is disposed between the bar 30 (FIGS. 9, 10) and the holding cap 29, said locking member 32 being spring-loaded by a flat spring 33 fixed on the guiding bar 30 and intended to control the angle of rotation of the ratchet wheel 27 along with the screw 26 thereby feeding the slide 20 for a predetermined amount corresponding to the thickness of a worn layer of the abrasive tool.

There is also provided a pawl 34 mounted on the intermediate lever 7 by means of a bracket 35 and biased to the ratchet wheel 27 by a spring 36 fixed to the bracket 35, said pawl ensuring the rotation of the ratchet wheel 27 together with the screw 26 and, hence, the movement of the slide 20 in the direction normal to the axis "C" of rotation of the abrasive tool 2.

Teeth of a rack 7" are cut on a side surface of the lever 7 (FIG. 4), said teeth engaging a central tooth gear 37 to impart reciprocating movement to the lever 7.

The tooth gear 37 is in mesh with a rack 38' formed on the side surface of a plunger 38 of the hydraulic cylinder 23, said cylinder being defined by a bore in the T-shaped housing 31 and closed on both sides by caps 39 and 40.

The tooth gear 37 is formed on a shaft mounted in supports 41 (FIG. 6) and 42 in the T-shaped housing 31. Gears 45 and 46 are fixed on free ends of the shaft of the central gear 37 by means on nuts 43 and 44, said gears being in mesh with racks 47 and 48 of the extreme levers 5 and 6 respectively to impart them rectilinear reciprocating movements.

According to the invention, the nut 25 (FIG. 4) clamped by a ring 49 and mounted in the key 17 rotatably about its axis is provided with teeth on the outer surface thereof, said teeth engaging a worm 50. A shaft 51 (FIG. 5) of the worm 50 extends outside the housing 18 to be accessible for adjusting movements of the slide along with the truing elements 5, 6 and 7 in the direction normal to the rotational axis "C" of the abrasive tool.

In accordance with the invention, the T-shaped housing 31 embracing the slide 20 and made integrally therewith is provided with a slot 52. This slot 52 accommodates guides 53 defined by an end face of the T-shaped housing 31 and a guiding bar 30 fixed to the housing 31 with the intermediate lever 7 disposed therebetween. The lever 7 is capable of reciprocating and moving rectilinearly along said guides 53 and in a plane parallel to a generatrix of the cylindrical surface *a* of the abrasive tool 2.

According to the invention, slots 55 (FIG. 6) and 56 are defined between the walls of the slide 20 and a wedge-shaped portion of the T-shaped housing 31, said walls in their upper part being bridged by a plate 54.

The slot 55 accommodates guides 57 defined by one surface of the wedge-like portion of the T-shaped housing 31 and by a guiding plate 58. The guiding plate 58 is rotatably mounted with respect to a sleeve 59 fixed to one side of the slide 20 by means of screws 60 (FIGS. 1, 7) and 61 acting in opposite directions. These screws 60 and 61 are accommodated in one wing of the T-shaped housing 31 made integrally with the slide so that the screw 60 biased against the plate 58 is located below the sleeve 59 while the screw 61 is located above the sleeve 59.

The slot 56 accommodates guides 62 (FIG. 6) defined between the other side of the wedge-like portion of the T-shaped housing 31 and a guiding plate 53. The guiding plate 63 is mounted rotatably about a sleeve 64 fixed to the other wall of the slide 20 by means of screws 65 (FIG. 1) and 66 acting in opposite directions.

The screws 65 and 66 are disposed in the other wing of the T-shaped housing 31 so that the screw 65, when it is biased to the plate 63, is located below the sleeve 64 while the screw 66 is located above said sleeve.

The racks 47 and 48 are placed between the guides 57 and 62 (FIG. 5, 6), with the levers 5 and 6 being fixed to said racks 47 and 48 by means of screws 67 and 68 respectively.

The racks 47 and 48 with levers 5 and 6 reciprocate along these guides 57 and 62 and are capable to rotate through a certain adjusting angle with respect to the sleeves 59 and 64 (FIG. 6) because the axes of said sleeves 59 and 64 coincide with a geometrical axis *f* of the tooth gears 45 and 46 is a horizontal plane and intersect therewith in vertical planes passing through the center of said tooth gears.

According to the invention, the mechanism for truing disk-like abrasive tools having a cylindrical surface confined by two taper surfaces operates in the following manner.

At first, the machine tool and the truing mechanism are to be prepared for operation.

In doing so, the bevel tooth gear 3 to be worked is fixed on the spindle 69 (FIG. 1) of a work head 70 by any means suitable for this purpose. Then, the disk-like abrasive tool 2 is chosen with regard to the module of the gear being worked. This tool is clamped in the spindle 9 by the manner known in the art.

The further step consists in adjusting the sleeve 8 together with the spindle 9 along the direction of the axis "C" of the spindle 9, this axial adjustment being made with the use of a conventional device (not shown in the drawings) adapted for this purpose and disposed in the carriage 4 of the machine tool 1.

The diamond tools 5', 6', 7' are adjusted to required positions in the levers 5, 6, 7 and fixed in these positions by any manner known for this purpose. The guides 57 accommodated in the slot 55 are adjusted by means of the screws 60 and 61. The rack 47 and the lever 5 fixed thereto by means of the screw 67 are set simultaneously with the adjustment of the guides 57 to a predetermined angle corresponding to the truing angle for one of the taper surfaces *b* of the disk-like abrasive tool 2.

The guides 62 disposed in the slot 56 are suitably positioned by means of the screws 65 and 66. The rack 48 and the lever 6 fixed thereto by means of the screw 68 are set simultaneously with the adjustment of the guides 62 to a predetermined angle corresponding to the truing angle for the other of the taper surfaces b of the disk-like abrasive tool 2.

The hydraulic system of the machine tool 1 is prepared for the operation.

To this end, the plungers 12 (FIGS. 4, 5) and 13 move the sleeve 8 through its connection to the flange 10 so that the spindle 9 occupies together with the abrasive tool 2 a required (upper) position predetermined by a conventional mechanism used for adjusting movements.

The surfaces 16' of the sleeve 8 embracing the key 17 serve for operative interconnection between the truing members 5, 6, 7 and the abrasive tool 2. Due to this interconnection the H-shaped housing 18 along with the slide 20 mounting the truing members 5, 6, 7 are moved along the guides thereby ensuring proper positioning of the truing members with respect to the cutting surfaces a, b of the abrasive tool 2.

The plunger 38 of the power cylinder 23 used for driving the slide 20 is shifted to its extreme lower position shown in the drawings.

In the course of this movement the teeth of the rack 7'' will turn the latter and, hence, the tooth gears 45 and 46. During the rotation of the tooth gears 45 and 46 the racks 47 and 48 will move along the guides 57 and 62 to their extreme position which is the original one with respect to the slide 20, the levers 5 and 6 together with the diamond tools 5' and 6' being moved simultaneously with said racks.

Simultaneously, the lever 7 will move to the extreme upper position with respect to the slide 20, the pawl 34 engaging the ratchet wheel 27 to rotate it so that the stopper 32 loaded by another flat spring 33 will enter a tooth space of the stopping gear 28. The rotation of the ratchet wheel 27 and the stopping gear 28 will turn the screw 26 to its initial position. During this rotation the screw is screwed into the nut 25 which is kept stationary due to the teeth formed on its periphery and engaging the thread of the worm 50.

The rotation of the screw 26 along with the ratchet wheel 27 and the stopping gear 28 mounted on its free end will shift the screw in the direction of its longitudinal axis. This causes the movement of the holding cap 29, guiding bar 30 and T-shaped housing 31, and, hence, of the slide 20 per se along its own guides 24 in the direction normal to the axis "C" of rotation of the abrasive tool 2 and toward the latter.

In doing so, the slide 20 with associated truing elements 5, 6, 7 mounted thereon will take an arbitrary (indefinite) intermediate position with respect to the cutting surfaces a, b of the abrasive tool 2.

Then the worm 50 is turned by turning manually the shaft 51 causing the rotation of the nut 25 in the rotational direction of the screw 26 which in this moment is held against rotation by means of the stopper 32. The screw 26 is moved longitudinally shifting the rigidly interconnected parts, namely, the holding cap 29, guiding bar 30 and T-shaped housing 31 and the slide 20 along the guides 24 in the direction of movement of the latter from the axis "C" of rotation of the abrasive tool 2.

The rotation of the shaft 51 continues until the end face of the T-shaped housing 31 positioned at the end of the slide 20 engages the cover 22.

Now the slide 20 with associated truing members 5, 6, 7 mounted thereon occupies its extreme initial position.

The mechanism is ready for operation.

With the use of any driving means known in the art suitable for the purpose the spindle 9 with the abrasive tool 2 attached thereto is brought into rotation at the cutting speed by a flexible shaft 71 (FIG. 1).

Thereupon the truing mechanism is started.

The plunger 38 of the power cylinder 23 is moved slowly to the extreme upper position. The devices adapted to adjust a flow rate of oil fed to the hydraulic cylinder 23 and included into the hydraulic system of the machine tool are known in the art and therefore they are not illustrated in the drawings. The rack 38' (FIG. 4) engages teeth of the central gear 37 and rotates it simultaneously with the tooth gears 45 and 46, said tooth gears 45 and 46 causing movement of the racks 47 and 48 along the guides 57 and 62 and the levers 5 and 6 carrying the diamond tools 5' and 6'. These tools, 5  and 6', in the course of their movement along paths corresponding to the shape of the cutting taper surfaces b, come into engagement with said surfaces b and remove from the rotating abrasive tool 2 that layer of the material which does not comply with this shape.

During its rotation the central tooth gear 37 meshes with the teeth of the rack 7'' and moves the lever 7 carrying the diamond tool 7' along the guides 53. In the course of its movement along the path corresponding to the shape of the cutting surface a, this diamond tool comes into contact therewith and removes an excess layer of the abrasive material from the abrasive tool 2.

In this case, the pawl 34 slides over the teeth of the ratchet wheel 27 and disengages the latter.

In the extreme upper position the plunger 38 feeds a signal from any known means suitable for this purpose (not shown) for changing the oil flow rate with the result that the plunger 38 begins to move slowly in opposite direction and turns the central gear 37 and the tooth gears 45 and 46, the latter causing movements of the racks 47 and 48 with levers 5, 6 carrying the diamond tools 5', 6' along the guides 57 and 62. In the course of their back movement along the same paths the diamond tools dress the taper cutting surfaces b of the rotating abrasive tool 2.

The central tooth gear 37 engages during its rotation the rack 7'' of the intermediate lever 7. This lever 7 in the course of its upward movement in the guides 53 dress the cylindrical cutting surface a of the abrasive tool 2 by means of the diamond tool 7' fixed to said lever and moved in the opposite direction along the same path.

When the diamond tools 5', 6' and 7' are cleared off the cutting surfaces a and b of the abrasive tool 2, the pawl 34 comes into engagement with the teeth of the ratchet wheel 27 and rotates the latter. The movement of the plunger 38, levers 5 and 6, the lever 7 with the pawl and the rotation of the ratchet wheel 27 terminate at the moment, when the stopper 32 loaded by the spring 33 and leaving one tooth space of the stopping gear 28 under the action of the force generated during rotation of the latter, will not drop into the next tooth space. In so doing, said parts 38, 5, 6, 7 will take their original positions.

During the rotation of the ratchet wheel 27 and the stopping gear 28 through an angle defined by positions of the tooth spaces of the latter, the screw 26 rotates screwing at the same time into the nut 25 which is held against rotation by the worm 50. After being turned the screw 26 together with the ratchet wheel 27 and the stopping gear 28 is shifted in its axial direction for an amount defined by the angle of rotation and the pitch of this screw. The holding cap 29, guiding bar 30 and T-shaped housing rigidly interconnected to one another and, hence, the slide 20 will move along the guides 24, said slide carrying therewith the truing elements 5, 6, 7 with the diamond tools 5', 6', 7'.

After the slide 20 moves in the direction normal to the axis "C" of rotation of the disk-like abrasive tool 2 for a given distance of approach to the latter, the truing members 5, 6, 7 take their new positions. In case of repeating the cycle the diamond tools 5', 6' and 7' are moved from these positions along paths defined by the shape of the taper surfaces $b$ and the cylindrical surface $a$ of the abrasive tool 2. In this case, the diamond tools 5', 6' and 7' move toward the rotational axis "C" of the abrasive tool 2 for amount of displacement defined by an angular distance between tooth spaces of the stopping gear 28 and by the pitch of the screw 26. The movement of the diamond tools in this case ensures removing of the abrasive tool layer with dull abrasive grains, that is, ensures the dressing of the abrasive tool 2.

To return the cutting edges $a$ and $b$ of the abrasive tool 2 located in the zone of contact with teeth of the gear 3 being worked to the position occupied by these edges before removing of the dull layer from the abrasive tool by means of the diamond tools 5', 6', 7', the abrasive tool 2 is shifted together with the carriage 4 and the truing mechanism mounted thereon toward the teeth of the gear 3 for an amount determined by the displacement of the slide 20.

The shifting of the slide 20 in the direction normal to the axis "C" of rotation of the abrasive tool 2 and the shifting of the carriage 4 in the direction normal to that of the slide 20 moving toward the gear 3 being worked take place simultaneously and are performed from a carriage feeding means. Any conventional mechanism (not shown) known in the art may be used for this purpose.

Upon completing operations of all the elements of the truing mechanism, the tooth gear 3 to be worked is fed toward the abrasive tool 2 rotating with the cutting speed about the axis "C", and thereupon the gear cutting operation takes place wherein the cutting surfaces $a$ and $b$ of the abrasive tool 2 come into engagement with one side of teeth of the blank gear 3.

The gear cutting operation per se is carried out on a well known profile generating principle and therefore the details are omitted from the description not to complicate understanding of the main principle of the present invention.

After the last tooth of the gear 3 is cut from one side of its teeth a signal is generated and fed to the hydraulic system of the machine tool 1 from a cycle counter 72 (FIG. 1). This causes the movement of the plungers 14 and 15 shifting the sleeve 8 through the flange 10 so that the spindle 9 along with the cutting tool 2 takes a new required (lower) position defined by the conventional mechanism suitable for adjusting movements.

As a result, a surface 16' of the sleeve 8 engages the key 17 and shifts the H-shaped housing 18 along the guides 21 and, hence, the slide 20 mounting the truing elements 5, 6, 7 thereby ensuring the required positioning of the latter with respect to the cutting surfaces $a$ and $b$ of the abrasive tool 2. In this manner, the actuation of the respective plungers 12-15 simultaneously displaces the housing 18, the truing elements 5, 6 and 7, and the abrasive tool 2 in directions parallel to the axis $c$. These simultaneous axial movements result from the connection of the sleeve 8 to the housing 18 which carries the slide 20 and the truing elements 5-7. Such an arrangement assures that the truing elements are always aligned with the abrasive tool 2 in an operative position to operate on the tool independently of the axial position of the tool. The movements of the truing elements together with the abrasive tool in directions parallel to the axis $c$ eliminate the need for critical adjustments of the truing elements each time the abrasive tool is axially displaced.

After said movements of the abrasive tool 2 along the axis "C" of rotation thereof, another side of the teeth of the gear 3 are cut by cutting surfaces $a$ and $b$ of the abrasive tool 2.

Upon completing the cutting of teeth on both sides thereof, the cycle counter 72 generates a signal to stop the machine tool 1. The machine tool stops with a transitional position of the surfaces $a$ and $b$ of the abrasive tool 2 between adjacent tooth spaces, that is, after the cutting surfaces $a$ and $b$ of the abrasive tool 2 have left the last treated tooth space but could not enter the next one yet.

With this position of said elements (i.e. of the abrasive tool and the tooth gear being worked) the truing mechanism is started. The diamond tools 5', 6', 7' remove a layer of worn abrasive grains and then the slide 20 and the carriage 4 are fed, as it has been described above. The truing mechanism operates in accordance with the cycle described.

Thus, the truing of the cutting surfaces $a$ and $b$ of the abrasive tool 2 in accordance with the cycle described above is carried out at a moment when the abrasive tool passes from one tooth space to another or after cutting all teeth of a gear on one side thereof, or on another side thereof, or after cutting a predetermined number of teeth.

Thus, the truing mechanism made according to the invention and provided with diamond tools arranged beyond the zone of contact of the abrasive tool with a tooth gear being worked may be advantageously used for truing a disk-like abrasive tool having one cylindrical surface confined by two taper surfaces. Another advantage of the mechanism according to the invention consists in that it may be used for truing a disk-like abrasive tool either during the transition of the latter from one tooth space of a bevel gear being worked to another one, or after cutting all the teeth of the gear on one side or on both sides thereof, or after cutting a predetermined number of teeth, the truing operation being performed without withdrawing the tooth gear to the loading position. This feature of the invention ensures high accuracy for the bevel gear cutting operation.

Still another advantage of the truing mechanism according to the invention consists in that the abrasive tool trued thereby makes it possible to cut bevel gears of different modules both from a whole blank or from a blank with previously formed tooth spaces, as well as to cut bevel gears from blanks heat-treated to a high degree of hardness up to HRC—64 or made out of the materials not amenable to tooth cutting or hobbing.

I claim:

1. In a mechanism for truing disk-like abrasive tools for use in a straight bevel gear cutting machine tool operating on a profile generating principle and including one axially displaceable disk-like abrasive tool adapted for cutting said bevel gear at a zone of contact and requiring truing in the course of said cutting, a cradle-mounted carriage carrying said abrasive tool having an axis of rotation, a driving means for rotation of said abrasive tool about said axis, truing elements to perform said truing operation, a self-contained drive means for said truing elements imparting to them movement along paths corresponding to the shape of cutting surfaces of said abrasive tool, said truing mechanism, including said truing elements being operatively connected to said abrasive tool to provide simultaneous axial displacements of said truing elements to correspond to the displacements of said abrasive tool in directions parallel to said rotational axis of said abrasive tool, and said truing mechanism, including said truing elements, being mounted beyond the zone of contact on said carriage for progressive movements of said truing elements in a direction normal to and towards said rotational axis to compensate for wear of said abrasive tool.

2. A mechanism according to claim 1, wherein each of the truing elements comprises a lever carrying a diamond tool and capable to execute reciprocating motion, one of said levers being an intermediate lever operatively connected to said moving means for movement in a plane parallel to a generatrix of a cylindrical surface of the disk-like tool, while two extreme levers, one on each side of said intermediate lever, are each operatively connected to said moving means for movement in respective planes parallel to generatrices of the taper surfaces confining said cylindrical surface.

3. A truing mechanism according to claim 1, wherein the truing mechanism includes a housing and a slide therein and said operative interconnection between the tool and the mechanism comprises a sleeve accommodating a spindle of the tool rotatable with respect to said sleeve, said sleeve having a drive means for combined adjusting movements together with the spindle in the directions parallel to the rotational axis of the tool and being provided with a slot having surfaces normal to the longitudinal axis of the sleeve; and a key inserted into said slot and tightly embraced therein and rigidly fixed to the housing of the mechanism for combined adjusting movements together with a slide in the direction parallel to the axis of rotation of the tool thereby ensuring required positioning of the truing members with respect to the cutting surfaces of the tool during the truing operation thereof.

4. A truing mechanism according to claim 1, wherein the truing mechanism includes a housing and a slide accommodated therein, and wherein said truing members are mounted on the slide, said movement means comprising a slide drive means for providing said movement of said truing members in the direction normal to said rotational axis of the tool.

5. A truing mechanism according to claim 4, wherein the truing mechanism, including said truing elements, are operatively connected to said abrasive tool to provide movement of said truing elements in the direction parallel to the rotational axis of said abrasive tool, said operative interconnection between the tool and the mechanism comprising a sleeve accommodating a spindle of the tool rotatable with respect to said sleeve, said sleeve having a drive means for combined adjusting movements together with the spindle in the directions parallel to the rotational axis of the tool and being provided with a slot having surfaces normal to the longitudinal axis of the sleeve, and a key inserted into said slot and embraced therein and rigidly fixed to the housing of the mechanism for combined adjusting movements together with a slide in the direction parallel to the axis of rotation of the tool thereby ensuring required positioning of the truing members with respect to the cutting surfaces of the tool during the truing operation thereof; a reciprocating plunger mounted on the slide for movements generally parallel to said rotational axis of said abrasive tool; a shaft having an axis normal to both said parallel and normal directions of movement of said truing elements; a central and two end gears being commonly and rigidly fixed on said shaft, said central gear being operatively engaged with said plunger and with said intermediate lever, and said two end gears being respectively engaged with said two extreme levers, reciprocating movements of said plunger causing said gears to rotate and cause said levers to reciprocate in directions parallel to said rotational axis of said abrasive tool, said slide drive means comprising a screw pair with a nut of this pair being accommodated in said key, and a ratchet wheel fixedly mounted on the free end of the screw of said screw pair, said ratchet wheel being fixed to said slide and rotatable about the axis of said screw to insure movement of said slide in the direction normal to said rotational axis of the abrasive tool, said pawl being arranged to actuate said ratchet wheel only after said truing elements have cleared off the cutting surfaces of the abrasive tool.

6. A truing mechanism according to claim 5, wherein said nut mounted in said key is provided on its periphery with teeth; a worm in engagement with said teeth, the shaft of said worm being extended outside the housing of the mechanism to be accessible for performing adjustment rotation of the nut.

7. A truing mechanism according to claim 4, wherein said slide is provided with slots; guides adapted to be accommodated within said slots for movement of said levers, said guides corresponding to said extreme levers being capable of executing adjustment rotation in order to change the truing angle of the taper surfaces of the tool, said adjustment rotation being carried out by means of screws mounted in said slide and working in opposite directions.

8. A truing mechanism according to claim 1, wherein said drive means automatically advances said truing elements in said directions parallel and normal to the axial direction of said abrasive tool when said truing elements are cleared off the cutting surfaces of said abrasive tool and said abrasive tool changes coordinates for working one side of a tooth of the gear being worked to the other side thereof.

9. A truing mechanism according to claim 1, wherein said moving means is arranged to advance said truing elements in a direction normal to said rotational axis and towards said abrasive tool after each truing operation once said truing elements have cleared off the cutting surfaces of the abrasive tool, said advancement being in substantially equal predetermined increments corresponding to the extent to which the dull abrasive grains on said abrasive tool are to be removed.

* * * * *